United States Patent [19]
Montoya et al.

[11] Patent Number: 5,949,688
[45] Date of Patent: Sep. 7, 1999

[54] COMPACT DISC RECORDER/VENDING MACHINE

[76] Inventors: Shauna Renee Montoya; Jeffrey Allan Forkum, both of 1828 Eastend St. NW., Olympia, Wash. 98502

[21] Appl. No.: 08/872,670

[22] Filed: Jun. 11, 1997

Related U.S. Application Data

[60] Provisional application No. 60/016,652, Jun. 27, 1996.
[51] Int. Cl.$^6$ .................................................... G06F 17/00
[52] U.S. Cl. .................................................... 364/479.05
[58] Field of Search ...................... 221/45, 3; 206/308.1; 364/479.01, 479.03, 479.08, 479.09, 479.05

[56] References Cited

U.S. PATENT DOCUMENTS

| | | | |
|---|---|---|---|
| 4,789,907 | 12/1988 | Fischetti et al. | 360/33.1 |
| 4,910,675 | 3/1990 | Burns et al. | 364/478 |
| 5,206,850 | 4/1993 | Tezuka et al. | 369/48 |
| 5,313,881 | 5/1994 | Morgan | 101/4 |
| 5,415,319 | 5/1995 | Risolia | 221/3 |
| 5,445,295 | 8/1995 | Brown | 221/3 |
| 5,633,839 | 5/1997 | Alexander et al. | 369/30 |
| 5,748,485 | 5/1998 | Christiansen et al. | 364/479.04 |

FOREIGN PATENT DOCUMENTS 1263167  11/1989  Canada ................... 342/11

*Primary Examiner*—William E. Terrell
*Assistant Examiner*—K W Bower
*Attorney, Agent, or Firm*—Richard C. Litman

[57] ABSTRACT

A compact disc ("CD") vending system that allows a purchaser to compile a series of desired tracks, and correctly write these to a compact disc. The invention also enables the customer to customize the jacket or surface of the compact disc with a desired slogan or graphic. Included are an ordering computer, a viewing computer, a keyboard, a payment slot that can take either cash, credit or debit cards, a data source, a CD recording unit, and a printing unit that can print words or graphics on the surface of CDs and their sleeves. The data source unit contains the information to be recorded onto the surface of a CD. The viewing computer will provide access to available titles, so that the user can watch and listen to them before making a selection. The ordering computer enables the user to place his or her order by entering its title or catalog number and any other information that may be required for the production of the CD. The ordering computer has a hard drive or other storage device containing information on available selections. In the first embodiment of the invention, the data source is an internal high capacity data storage system, containing files with all available selections. In the second embodiment of the invention, the data source is a CD jukebox. In the third embodiment of the invention, an outside host system contains the data source which is accessed using a high speed modem.

5 Claims, 4 Drawing Sheets

5,949,688

COMPACT DISC RECORDER/VENDING MACHINE

CROSS-REFERENCE TO RELATED APPLICATION

This application claims the benefit of U.S. Provisional Patent Application Ser. No. 60/016,652, filed Jun. 27, 1996.

BACKGROUND OF THE INVENTION

1. Field of the Invention

The present invention relates to vending machines for distributing digitally encoded media, more particularly, to a compact disc (or other data carrying media) recording and vending system.

2. Description of the Prior Art

In the prior art there is a myriad of vending machines, some specifically for dispensing compact discs. However, no prior art vending machine provides an interface allowing users to select the information of choice. That is, no prior art device records on a compact disc, from a data source, any music, video, movie, data, software, etc. on demand.

For example, U.S. Pat. No. 4,789,907, issued on Dec. 6, 1988, to Peter Fischetti and John E. Swantek, III, discloses a vending system which allows a customer to record a personal message on a blank video cassette tape, or to view an inserted prerecorded video cassette tape. The instant invention is distinguishable in that it is a system for vending compact discs, that allows the customer to select information to be digitally recorded to the compact discs from a hard disc or other data source.

U.S. Pat. No. 5,206,850, issued on Apr. 27, 1993, to Masaru Tezuka, Satoru Tobita, and Koji Ishiwata, discloses an optically writable record of digital information and a recording apparatus therefor, which is not a vending system, as is the instant invention.

U.S. Pat. No. 5,313,881, issued on May 24, 1994, to William T. Morgan, discloses a compact disc marking apparatus, which is not a vending system, as is the instant invention.

U.S. Pat. No. 5,415,319, issued on May 16, 1995, to Joe Risolia, discloses a vending machine for articles including compact discs, cassette tapes, video tapes, and books, with headphones by which a customer can listen to compact discs before deciding whether to purchase them. The instant invention is distinguishable in that it allows the customer to view as well as listen to compact discs before purchasing, provides for recording to the compact disc at the time of purchase from a data source, and allows the customer to select information and graphics to be printed on the faces of and sleeves for the compact discs.

U.S. Pat. No. 5,445,295, issued on Aug. 29, 1995, to Graham Brown, discloses an automated vending machine for recorded goods, which can play compact discs that the customer is deciding whether to purchase. It is distinguishable from the instant invention, in that discs are not recorded from a data source upon sale.

Canadian Patent No. 1 263 167, issued on Nov. 21, 1989, to Florent Pelletier, discloses a computer controlled vending apparatus, which does not play or record compact discs.

None of the above inventions and patents, taken either singly or in combination, is seen to describe the instant invention as claimed.

SUMMARY OF THE INVENTION

The invention is a compact disc vending system. The vending system operates in a manner that allows a purchaser to compile a series of desired tracks (in the form of music, video, data, etc.), and correctly writes (or digitally encodes or records) the same to a compact disc, or other media carrier. In addition, the invention allows the purchaser to customize the surface of the compact disc (or other media carrier), label or packaging with desired indicia, as slogans, titles, or graphics.

Accordingly, it is a principal object of the invention to provide an automatic vending system for compact discs and other recording media.

It is another object of the invention to provide a vending system that enables customers to make selections from a data source to be recorded onto a compact disc or other media.

It is a further object of the invention to provide a means for enabling the printing of messages or other indicia onto the labels or packages of the compact discs and/or other media.

Still another object of the invention is to provide a new and improved automatic vending system for compact discs and other data carrying media having preview options for both viewing/or and listening to sample bites before final selection.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
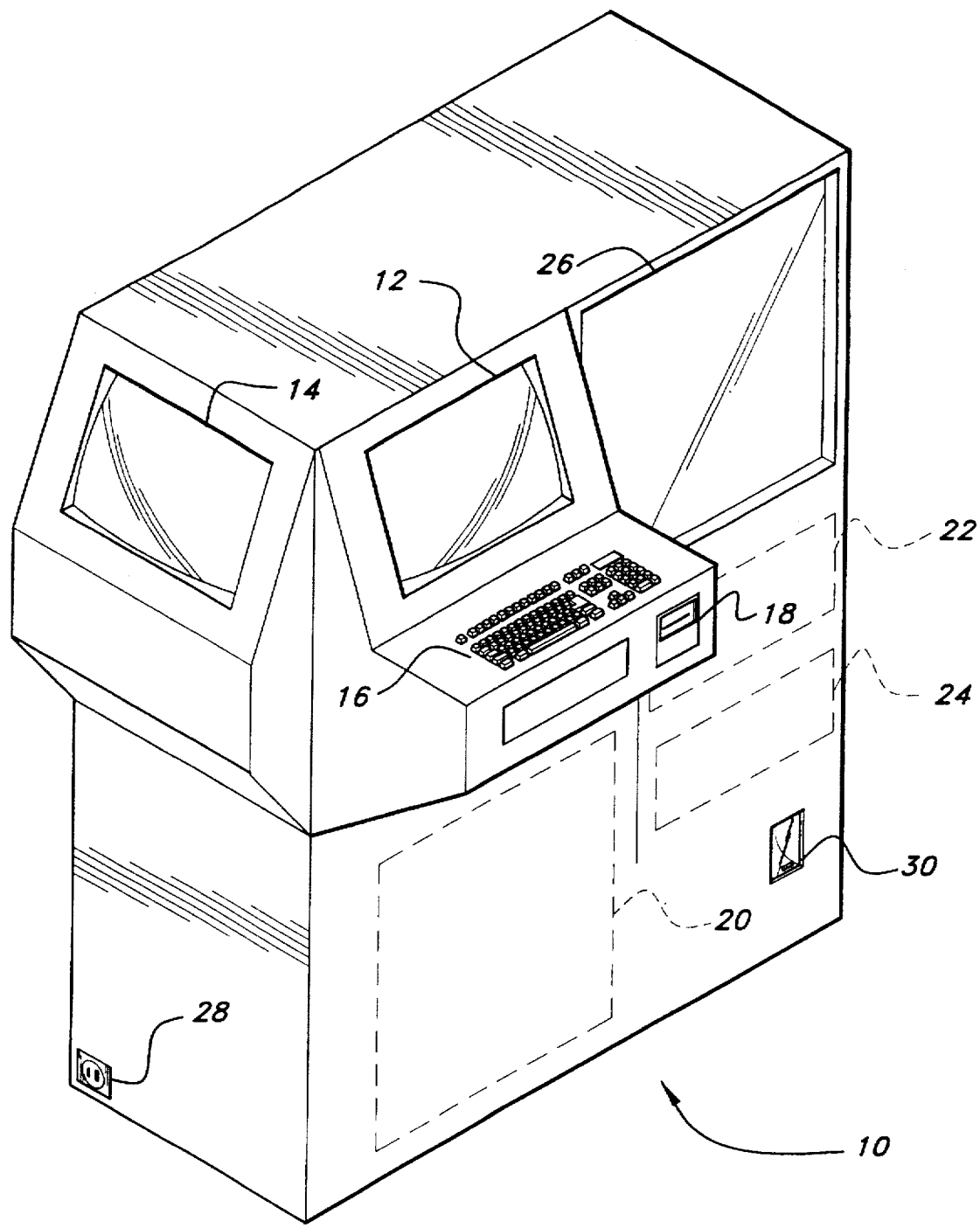
FIG. 1 is a perspective illustrative view of the vending device of the invention.

The present invention is a point of sale or vending system for distribution of selectively recorded compact discs, video discs, data or software discs, etc. (hereinafter collectively referred to as "CD"). FIG. 1 illustrates an outside appearance of the CD vending system 10. The system 10 in under conventional computer control having one or more microprocessors or central processing units. Included are an ordering screen (preferably touch screen) 12, a previewing monitor 14, a keyboard 16, a payment slot 18, a viewing window 26, a dispensing slot 30 and an electric connector 28 for a power supply. In addition, provided internally of the vending system 10 (shown in dashed lines) are a data source unit 20, a CD recording unit 22, a printing unit 24 for printing indicia (words or graphics) on the surface of the CDs and/or packaging. The keyboard 16 may be included in the ordering screen 12 as part of the preferred touch screen, thus resulting in an easier and more user friendly system 10. Also, the payment slot 18 is capable of receiving either cash, credit and/or debit cards.

The data source unit 20 contains the information to be recorded onto the surface of a CD. The previewing monitor 14 will provide access to available selections via a menu/icon driven catalog software, so that the user can watch and listen to selected samples before making a selection. The ordering screen 12 enables the user to place an order also via the menu/icon driven catalog software for the production of the CD. The ordering screen 12 accesses a hard drive or other storage device containing information pertaining to the available selections. The previewing monitor 14 and ordering screen 12 are interconnected via a network, allowing the previewing monitor 14 access to selection information located on the storage device of ordering screen 12.

Figure 2:
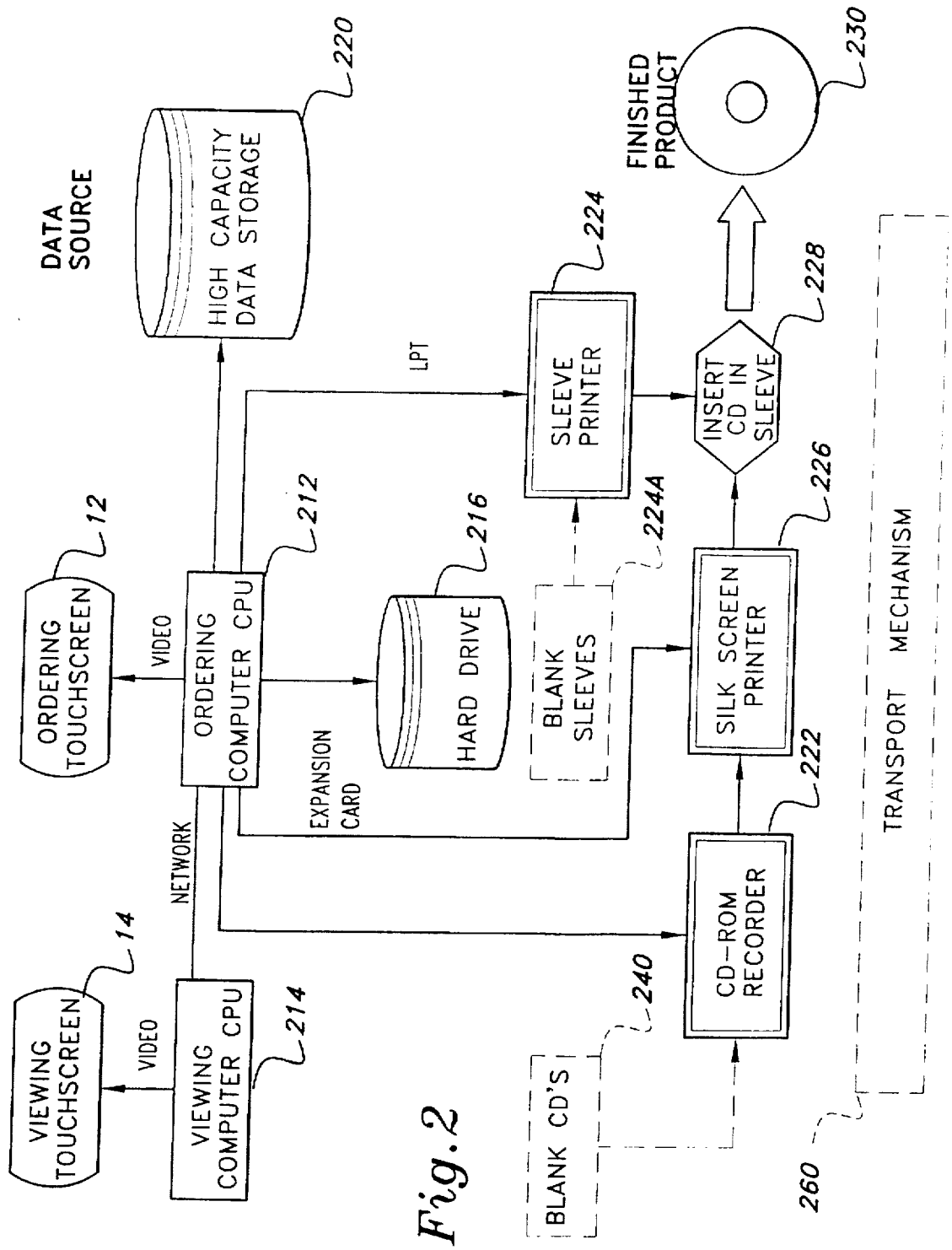
FIG. 2 is a flow diagram of the first embodiment of the invention.
Figure 3:
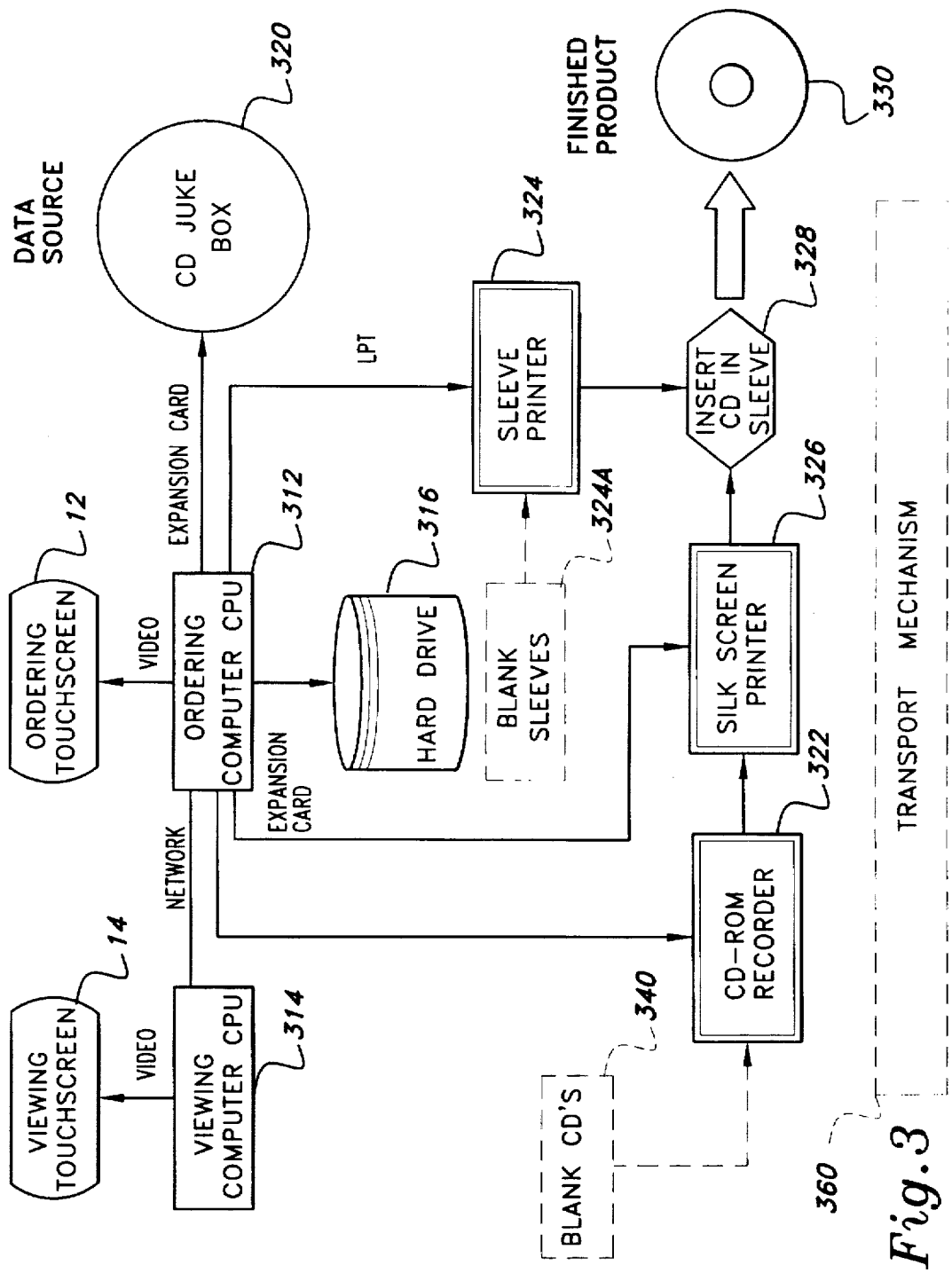
FIG. 3 is a flow diagram of the second embodiment of the invention.
Figure 4:
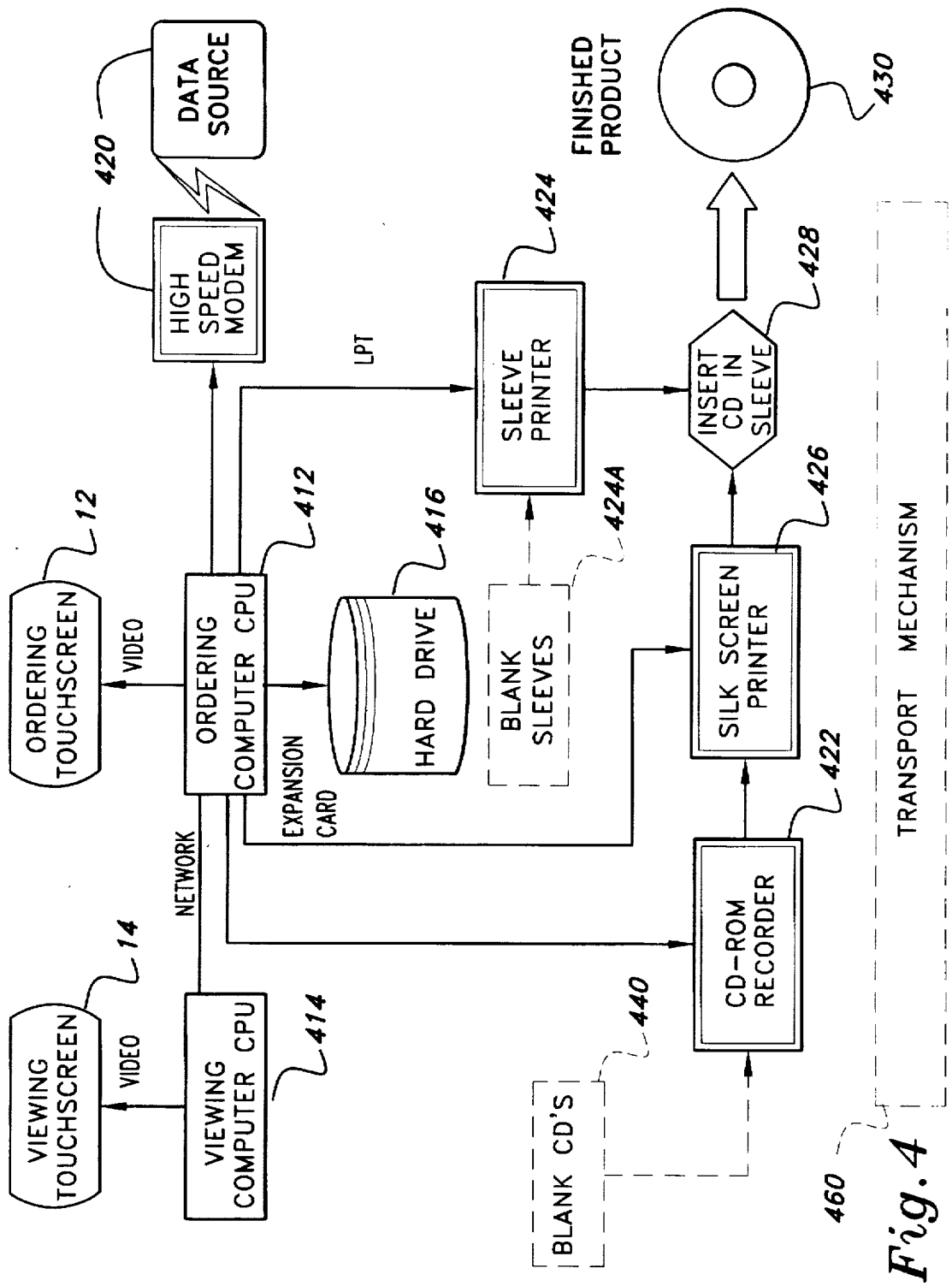
FIG. 4 is a flow diagram of the third embodiment of the invention.

FIGS. 2–4 represent the three fundamental embodiments for system 10 in producing the desired CDs. The reference numerals in each of FIGS. 2–4 have a leading digit corresponding to the respective Figure; the components are generally the same unless otherwise noted. Specifically FIG. 2 is a flow diagram of the first embodiment of the invention, in which the data source is an internal high capacity data storage system 220, containing the data files of all available selections. When the customer makes a selection (via ordering screen 12 or CPU 212, upon verification of payment, system 10 proceeds to record the selected data by copying from the storage unit 220 onto the CD. This is carried out by a transport mechanism 260 under the control of CPU 212. The transport system 212 retrieves a CD from the blank CD bin 240 and places it in the CD recorder unit 222. Following the unit 222 is a CD printing unit 226 for generating the desired indicia on the CD surface. Simultaneously, a blank CD sleeve (or packaging) is retrieved from a blank sleeve bin 224A and delivered to a secondary sleeve printer 224 for imparting the desired indicia onto the sleeve. The transport mechanism then places the prepared CD into the prepared sleeve and delivers the finished product 230 at the dispensing slot 30.

FIG. 3 is a flow diagram of the second embodiment of the invention, in which the data source is a CD jukebox 320. When the customer makes a selection (via ordering screen 12 or CPU 312, upon verification of payment, system 10 proceeds to record the selected data by copying from the jukebox 320 onto the CD. Selections stored on individual CDs of jukebox 320 are swapped in and out as required. From the bank of CDs located in the jukebox 320, the required CD is accessed by the jukebox 320, and the desired selection is recorded from the CD in the jukebox 320 to the point of sale CD. This is carried out by a transport mechanism 360 under the control of CPU 312. The transport system 312 retrieves a CD from the blank CD bin 340 and places in the CD recorder unit 322. Following the unit 322 is a CD printing unit 326 for generating the desired indicia on the CD surface. Simultaneously, a blank CD sleeve (or packaging) is retrieved from a blank sleeve bin 324A and delivered to a secondary sleeve printer 324 for imparting the desired indicia onto the sleeve. The transport mechanism 360 then places the prepared CD into the prepared sleeve and delivers the finished product 330 at the dispensing slot 30.

FIG. 4 is a flow diagram of the third embodiment of the invention, with an external data source 420. Typically, external data source 420, a remote host system containing a multiplicity of encodable selections, is accessed using a modem, or other data linking architecture. The modem may use either a dial up connection on a telephone line or a dedicated line to the host system. In most instances, in this embodiment, when the customer has made the chosen selections, the selected files are downloaded from the host. This is carried out by a transport mechanism 460 under the control of CPU 412. The transport system 412 retrieves a CD from the blank CD bin 440 and places it in the CD recorder unit 422. Following the unit 422 is a CD printing unit 426 for generating the desired indicia on the CD surface. Simultaneously, a blank CD sleeve (or packaging) is retrieved from a blank sleeve bin 424A and delivered to a secondary sleeve printer 424 for imparting the desired indicia onto the sleeve. The transport mechanism 460 then places the prepared CD into the prepared sleeve and delivers the finished product 430 at the dispensing slot 30.

The CD recorder 22 (or 222, 322, 422) is capable of recording digital information onto the compact disc in various formats. It allows the vending system 10 to supply music discs as well as computer formatted discs containing software programs.

The printing unit 24 in FIG. 1 has two components shown in FIGS. 2–4: a silk screen printer to print on the face of the CD and a sleeve printer to print on the sleeve in which the CD is placed when not in use. The silk screen printer interfaces with the ordering screen 12 using a cable connected proprietary expansion card which plugs into the ordering screen 12 motherboard. The sleeve printer will print information on the chosen selections and other information chosen by the customer onto the CD sleeve. The sleeve printer may be custom built for the specific purpose of sleeve printing, and will connect to the ordering screen 12 via the LPT parallel port.

Custom software programs will perform functions including: providing browsing features for viewing available selections; accepting order information from the customer; tracking sales information for the purposes of identifying popular titles and tracking royalties requirements; and interfacing with external host systems for the purposes of updating selection lists, retrieving chosen selections from the data source, and uploading sales information.

The list of available selections will be contained in a database on the ordering screen 12 hard drive. A suitable database programming language will be used to query the database while a potential customer is browsing available selections using the viewing touchscreen. The software will allow the customer to locate desired titles by navigating through a series of screens. The customer is first asked if he or she wants a music or software CD. If music, then he or she is next asked to choose the style (e.g., classical, country, or rock), then the artist. If software, then the customer is asked what type (e.g., games or utilities). The customer will be asked what method of payment is preferred, and if they wish to have a message printed on the CD sleeve. Software for collecting and ordering information will use the same interface for browsing the available selections, and will have the ability to tag choices to be included on the CD.

Sales information will be tracked by adding additional fields to the available selections database. Information on each sale, such as time and date, will be logged for each title. Reports will be generated with sales data, to determine the popularity of various titles, and to determine royalties obligations. The vending system has a parallel port connected to the ordering screen 12 which can be used for plugging in an external printer (not shown) for printing reports. Reports and information can also be uploaded to data gathering centers using a modem and telephone line.

In the third embodiment having the high speed modem, software will control modem operations, such as dialing the host computer, controlling the uploading and downloading of files, and placing the modem into auto-answer mode so that outside hosts can dial in to collect sales information.

The viewing touchscreen will have access only to the portion of a program that allows browsing of titles. The ordering touchscreen will have access to all parts of all programs. Customers will be able to access only the title browsing or placing orders features. Management staff will be able to access all programs.

The transport mechanism in FIGS. 2–4 is a custom device for transferring the CD from one component to the next.

It is to be understood that although the concentration of this disclosure is drawn to CDs, all other types of digitally encoded or recorded media are encompassed and connotatively defined by CD. For example, video disks, video tapes, software, data files, audio tapes, and credit card sized memory devices (e.g., flash RAM and/or ROM cards, P-ROM and EP-ROM modules, etc.) are just a fraction of data carrying media encompassed by the present invention. In addition, the payment slot may also include MICR decoders for payment using personal, business, or travelers checks, money orders, and any and all other types of financial transacting schemes.

It is to be understood that the present invention is not limited to the embodiments described above, but encompasses any and all embodiments within the scope of the following claims.

We claim:

1. A digital media vending system, comprising:

a source supply of target media blanks;

a source supply of blank sleeves for said media blanks;

a high capacity data storage device for digitally storing a plurality of data selections;

previewing processor means for accessing said plurality of data selections and displaying said plurality of data selections in an audiovisual format prior to ordering chosen data selections;

encoding means for replicating said chosen data selections from said high capacity storage device on a target media;

printer means for printing selected indicia on a surface of said target media and a sleeve of said target media; and processing means for ordering said chosen data selections and transferring said chosen data selections from said high capacity storage device to said encoding means.

2. The digital media vending system according to claim 1, said previewing processor means including a touchscreen for selecting and displaying said chosen data selections; and said processing means including a touchscreen and a keyboard for selecting and transferring said chosen data selections from said high capacity data storage device to said target media.

3. The digital media vending system according to claim 1, including exchange means for executing financial payment transactions.

4. The digital media vending system according to claim 1, wherein said printer means includes a silk screen printer for printing graphics on labels said target media.

5. The digital media vending system according to claim 1, wherein said printer means includes a sleeve printer for printing selected graphics on said sleeve of the target media.

* * * * *